United States Patent
Zhang et al.

(10) Patent No.: US 12,483,713 B2
(45) Date of Patent: Nov. 25, 2025

(54) HUMAN VISUAL SYSTEM ADAPTIVE VIDEO CODING

(71) Applicant: Intel Corporation, Santa Clara, CA (US)

(72) Inventors: Ximin Zhang, San Jose, CA (US); Sang-Hee Lee, San Jose, CA (US); Keith Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/665,022

(22) Filed: May 15, 2024

(65) Prior Publication Data

US 2024/0357138 A1    Oct. 24, 2024

Related U.S. Application Data

(63) Continuation of application No. 16/869,053, filed on May 7, 2020, now Pat. No. 12,022,096.

(51) Int. Cl.
*H04N 19/196* (2014.01)
*H04N 19/124* (2014.01)
(Continued)

(52) U.S. Cl.
CPC ......... *H04N 19/196* (2014.11); *H04N 19/124* (2014.11); *H04N 19/14* (2014.11); *H04N 19/176* (2014.11); *H04N 19/177* (2014.11)

(58) Field of Classification Search
CPC .... H04N 19/196; H04N 19/124; H04N 19/14; H04N 19/176; H04N 19/177; H04N 19/154
See application file for complete search history.

(56) References Cited

U.S. PATENT DOCUMENTS

| | | | |
|---|---|---|---|
| 8,737,464 B1 | 5/2014 | Zhang | |
| 2010/0124274 A1* | 5/2010 | Cheok | H04N 19/70 375/E7.125 |

(Continued)

OTHER PUBLICATIONS

United States Patent and Trademark Office, "Notice of Allowance and Fee(s) Due," issued in connection with U.S. Appl. No. 16/869,053, dated Feb. 16, 2024, 7 pages.

(Continued)

*Primary Examiner* — Boubacar Abdou Tchoussou
(74) *Attorney, Agent, or Firm* — Hanley, Flight & Zimmerman, LLC

(57) ABSTRACT

An example apparatus for encoding video frames includes a mask selector to select a subset of visual masks according to an actual target compression ratio and GOP configuration and a complexity estimator to estimate a picture level spatial/temporal complexity for a current frame. The example apparatus further includes a GOP adaptive visual mask selector to specify a visual mask from the subset of the visual masks corresponding to the estimated spatial and temporal complexity value a good enough picture QP deriver to derive a good enough picture QP value using the visual mask. The example apparatus also includes an adjustor to adjust the good enough picture QP value based on block level human visual system sensitivity and statistics of already encoded frames to obtain a final human visual system QP map.

19 Claims, 8 Drawing Sheets

(51) Int. Cl.
*H04N 19/14* (2014.01)
*H04N 19/176* (2014.01)
*H04N 19/177* (2014.01)

(56) References Cited

U.S. PATENT DOCUMENTS

| | | |
|---|---|---|
| 2015/0319437 A1* | 11/2015 | Zhang ................ H04N 19/176 375/240.03 |
| 2016/0088298 A1 | 3/2016 | Zhang |
| 2020/0204805 A1 | 6/2020 | Pihl |

OTHER PUBLICATIONS

United States Patent and Trademark Office, "Non-Final Office Action," issued in connection with U.S. Appl. No. 16/869,053, mailed on Sep. 12, 2023, 15 pages.

\* cited by examiner

400

500

HUMAN VISUAL SYSTEM ADAPTIVE VIDEO CODING

RELATED APPLICATION

This patent arises from a continuation of U.S. patent application Ser. No. 16/869,053, which was filed on May 7, 2020. U.S. patent application Ser. No. 16/869,053 is hereby incorporated herein by reference in its entirety. Priority to U.S. patent application Ser. No. 16/869,053 is hereby claimed.

BACKGROUND

Video codecs are used to efficiently encode videos for transfer between devices or playback on devices with particular playback support. For example, one such codec is the H.264/AVC codec standard.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
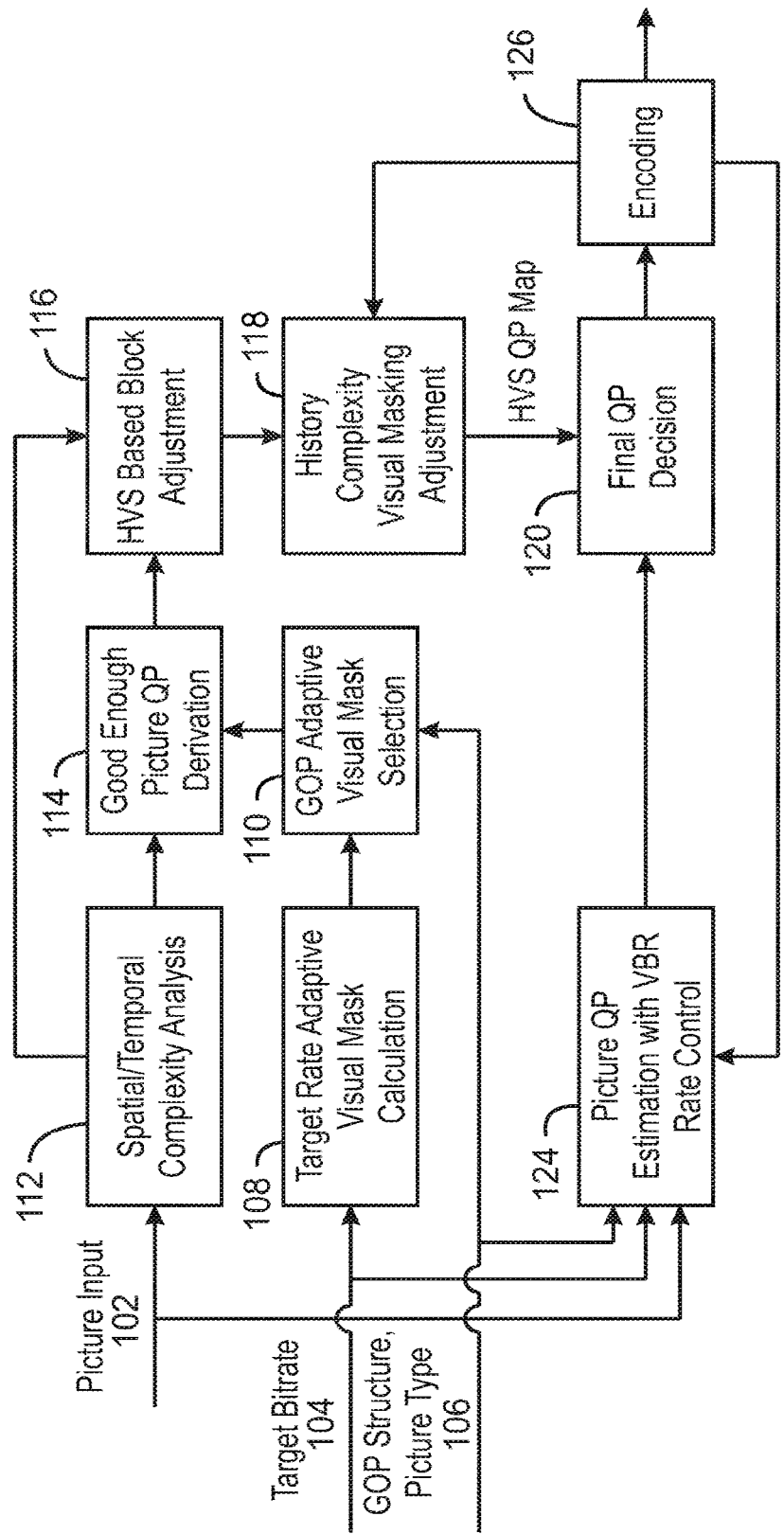
FIG. 1 is a block diagram illustrating an example system for human visual system adaptive video coding.

Bit rate control is one technique that differentiates one video coding solution from other video coding solutions. The technology to achieve a good enough video quality with a minimum bitrate is desirable for many video applications, especially for high quality content storage. Under many circumstances, controlling the frame size to a predictable value may be used by applications, particularly network related applications. With an optimal bit allocation, both subjective and objective improvements can be obtained. To achieve these improvements, most rate control algorithms, given a target bitrate, adjust a quantization parameter (QP) value of each picture to control the bits generated from the pictures so that the target bitrate can be reached. As used herein, a picture may refer to a frame in a video or other series of pictures.

Visual masking occurs when the visibility of one portion or object in a picture is reduced by the presence of another object and background. Due to visual masking, the human eye is more sensitive to quality changes in areas with flat and simple textures spatially. The human is also more sensitive to small changes temporally. Additionally, the human visual experience is also affected by the particular observer's quality expectations. The lower the expectation, the easier it is to achieve a good visual experience. In embodiments, the quality expectation is highly correlated to the compression ratio and observer's impression on just played video segments.

For example, the HEVC test model (HM) reference rate control algorithm assigns a size to each frame of a video based on the frame's location within a group of pictures (GOP) and the target compression ratio. As used herein, a GOP is a collection of successive pictures within a coded video stream. Each coded video stream consists of successive GOPs. As one example, if GOP8 is used, each frame within a GOP of eight frames always use a fixed percentage of bits that is allocated to all eight frames, and the same number of bits are always allocated to each grouping of eight frames. This approach does not consider the characteristics of the human visual system (HVS). Particularly, this type of coding cannot effectively adapt to the contents of the video such as spatial complexity and temporal correlation. As a result, too many bits are wasted on some scenes and clips while some complex clips or video scenes are of low quality. In order to achieve good enough quality content for high quality content storage, a large target bitrate is usually selected, and the associated storage requirement is significant.

The present techniques relate generally to human visual system adaptive encoding. In embodiments, a target rate adaptive visual mask calculation is performed to derive a set of visual masks corresponding to the target compression ratio and spatial/temporal complexity through offline training. During the encoding process, a spatial/temporal complexity analysis is applied to a current frame and a visual mask is selected based on an estimation of the spatial/temporal complexity. A picture level good enough QP is derived from the selected visual mask. The picture level good enough QP is adjusted for each block of the frame based on a human visual system (HVS) analysis. In embodiments, the HVS analysis includes block level human visual system sensitivity and statistics of already encoded frames. Based on the HVS analysis, the picture level good enough QP is adjusted for each such that HVS sensitive areas of the picture are encoded using smaller QP values, while non-HVS sensitive areas of the picture use larger QP values. The derived block level QP values may be further adjusted according to a history complexity analysis. The adjustments are used to generate a good enough HVS QP map for the current frame. The HVS QP map is used to restrict the typical QP derived from variable bit rate (VBR) rate control and a final QP is generated for each block of the current frame.

As used herein, a QP value indicates an amount of quantization to be applied to a particular macroblock at encoding. A macroblock or block refers to a processing unit of a frame specified by a coding standard. The QP value regulates how much spatial detail is saved. A picture level QP value is a QP value applied to an entire frame, with all blocks of the frame using the picture level QP. A block level QP value is a QP value applied to each block of a frame. For a given frame, the block level QP value may be different for each block. When the QP value is very small, almost all detail is retained. As the QP value is increased, some detail is aggregated such that the bit rate drops at the cost of some increase in distortion and some loss of quality. For example, in the H.264 coding standard, the QP value ranges from 0 to 51.

FIG. 1 is a block diagram illustrating an example system for human visual system adaptive video coding. The example system 100 can be implemented in the computing device 700 in FIG. 7 using one or more of the methods 200, 300, 400, 500, and 600 of FIGS. 2, 3, 4, 5, and 6, respectively. As illustrated, the example system 100 includes a picture input 102, a target bit rate input 104, and a GOP structure and picture type input 106.

For each video codec or video coding standard, a target rate adaptive visual mask calculation 108 is performed to derive a set of visual masks for all target compression ratio supported by the video codec or video coding standard. The set of visual masks for each standard may be based on spatial/temporal complexity and GOP configuration, and the set of visual masks are derived through offline training. During encoding, a subset of the visual masks is selected at the GOP visual mask selection 110. In embodiments, the subset of visual masks is selected according to an actual target compression ratio and GOP configuration associated with a current frame. A visual mask generally refers to a predefined visibility of one or more portions of a frame. For example, in view of general spatial/temporal complexity, because the encoding artifacts of less complex portions of an image are more visible, a high visibility mask is used when compared to more complex portions of an image.

During the encoding process of each frame, the spatial/temporal complexity analysis 112 is applied. The spatial/temporal complexity 112 analysis may determine the complexity of the current frame as the number of generated bits for each frame is used as the complexity measurement of the input picture 102. Additionally, the complexity may be determined as a prediction distortion value associated with the current picture. The spatial/temporal complexity analysis 112 estimates a picture level spatial and temporal complexity for the current frame that is input to a good enough picture QP derivation 114. At the good enough picture QP derivation 114, a specified visual mask is selected from the subset of the visual masks corresponding to the estimated spatial and temporal complexity value of the current frame obtained by spatial/temporal complexity analysis 112. This visual mask is used to estimate a good enough picture QP value.

A good enough picture level QP value is a QP value for all blocks of the current frame that is expected to generate an encoded picture with a visual quality that is acceptable based on the complexity and target bit rate of the current frame. This good enough picture level QP value may be derived during offline training when generating the set of visual masks. Each mask is corresponding to a set of specified QP values. The mask corresponding to high visibility is mapped to smaller QP, and the mask corresponding to low visibility is mapped to larger QP.

This estimated good enough picture QP value is sent to an HVS based block adjustment module 116, where the good enough picture QP value is adjusted based on a block level HVS sensitivity of each macroblock/block of the current frame. In doing so, the HVS sensitive blocks may use a smaller QP value, and non-HVS sensitive blocks may use a larger QP value. The adjusted good enough picture QP values for blocks of the current frame are sent to a history complexity visual masking adjustment module 118. At the history complexity visual masking adjustment module 118, the adjusted QPs are further adjusted according to actual encoding statistics of the previously encoded frames. A final HVS QP map is obtained for each block in the current frame and used for a final QP decision at block 120. A picture level QP estimation with variable bit rate control VBR 124 is determined and provided as input to the final QP decision at block 120. The picture level QP estimation with variable bit rate control (VBR) 124 derives an initial QP to encode the current frame. In embodiments, the initial QP is determined for the entire frame given a target bitrate, and a rate control algorithm adjusts the QP value of each picture in a GOP to control the bits generated from the pictures such that the target bitrate can be reached.

At the final QP decision at block 120, the initial QP is compared to the HVS QP map obtained from the history complexity visual masking adjustment model 118 for each block. For each block, if the initial QP value is less than the QP value for the corresponding block from the HVS QP map, the QP value from the HVS QP map is selected for the current block and used for the subsequent encoding process. An encoder 126 proceeds with encoding the current frame at block 126, and provides encoding statistics for previously encoded frames to the history complexity visual masking adjustment 118 and the picture QP estimation with VBR rate control 124.

The diagram of FIG. 1 is not intended to indicate that the example system 100 is to include all of the components shown in FIG. 1. Rather, the example system 100 can be implemented using fewer or additional components not illustrated in FIG. 1 (e.g., additional statistics, QPs, encoders, etc.).

In this manner, the present techniques provide a target rate adaptive visual mask estimation that defines a good enough picture quality resulting from the good enough picture QP value derivation. Additionally, the history complexity analysis utilizes the human visual system's visual memory effects to adjust the target rate adaptive visual mask on the fly. Moreover, the system according to the present techniques is developed to integrate the extracted visual masks into traditional rate control. As the result, the rate control automatically allocates less bits on the simple scenes and used the saved bits on complex scenes. The overall quality can be improved. Moreover, the present techniques use single pass encoding without the need for multiple passes to encode.

Figure 2:
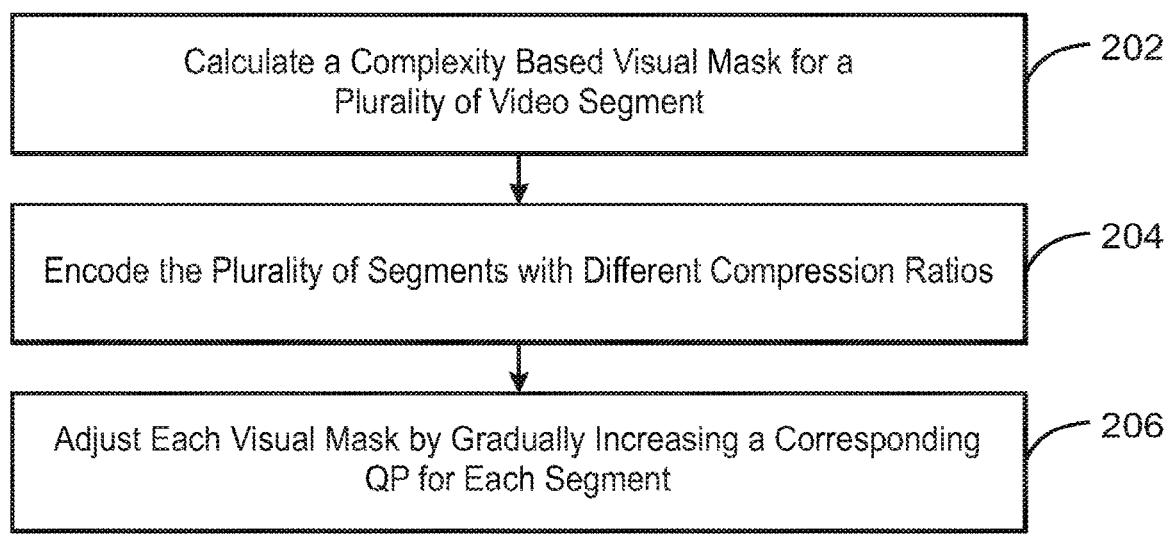
FIG. 2 is a process flow diagram of a method for target rate adaptive visual mask calculation.

FIG. 2 is a process flow diagram of a method 200 for target rate adaptive visual mask calculation. The example method 200 can be implemented in the system 100 of FIG. 1, the computing device 700 of FIG. 7, or the computer readable media 800 of FIG. 8. As discussed above, a human's visual quality impression is highly correlated with expectation. This expectation is correlated with the target bitrate (compression ratio) and history quality information. Accordingly, target bitrate adaptation may be combined with conventional spatial/temporal complexity analysis to derive a new target adaptive visual mask.

At block 202, a complexity based visual mask is calculated for one or more video segments. To calculate the set of visual masks, a target bit rate is received and one or more video segments are encoded with different QP values. The video segments may be obtained from a testing data set that includes video segments used for offline training with varying levels of complexity. A maximum QP value is derived that can generate a visual lossless quality for each video segment. To determine the maximum QP, a group of experts evaluate the real time displayed encoding bitstreams and find the maximum QP that can generate visual lossless quality. This evaluation may occur for each video coding standard. In embodiments, the group of experts may set the maximum QP values for the segments based on their own visual observation of the affect that QP values have on each segment. In embodiments, spatial/temporal analysis is applied to segments that share the same visual lossless QP values. The segments that share the same visual lossless QPs are grouped together. The spatial/temporal complexity analysis is applied on each group and an average complexity value is obtained for the group. A complexity based visual mask is then calculated for each group of segments. Thus, the complexity based visual mask is built with complexity as the input and group QP as the output.

At block 204, each of the plurality of segments are encoded using different compression ratios. The different compression ratios are derived from target bit rates. The target bit rates can be identified according to the particular video coding standard being used. During this encoding, for each compression ratio range, an average QP value is calculated. This average QP value may be referred to as a good enough QP value.

At block 206, for each compression ratio or target bit rate used, the visual mask from block 202 is adjusted to generate a specified visual mask for the corresponding compression ratio. In embodiments, the visual mask is adjusted by gradually increasing the QP values resulting from each complexity if the average QP value found at block 204 is larger than the median of the group QP found at block 202. For each complexity range, the increase step size is different. In embodiments, the larger the complexity, the larger the increase step size in QP. A two-dimensional good enough QP lookup table is obtained with complexity and compressional ratio as the inputs for lookup. In embodiments, the target rate visual mask calculation described in FIG. 2 can be applied to different GOP configurations to generate the good enough QP lookup tables accordingly. During the encoding process, the QP look up table that corresponds to the actual GOP and compression ratio is selected.

This process flow diagram is not intended to indicate that the blocks of the example method 200 are to be executed in any particular order, or that all of the blocks are to be included in every case. Further, any number of additional blocks not shown may be included within the example method 200, depending on the details of the specific implementation.

As an example, consider a frame level complexity divided into 20 levels. The example QP look up table for one high compression ratio can be shown as follows. Each QP value is corresponding to a frame level complexity level. {18, 19, 20, 21, 22, 23, 24, 25, 26, 27, 28, 29, 30, 31, 32, 33, 34, 35, 36, 37}

Figure 3:
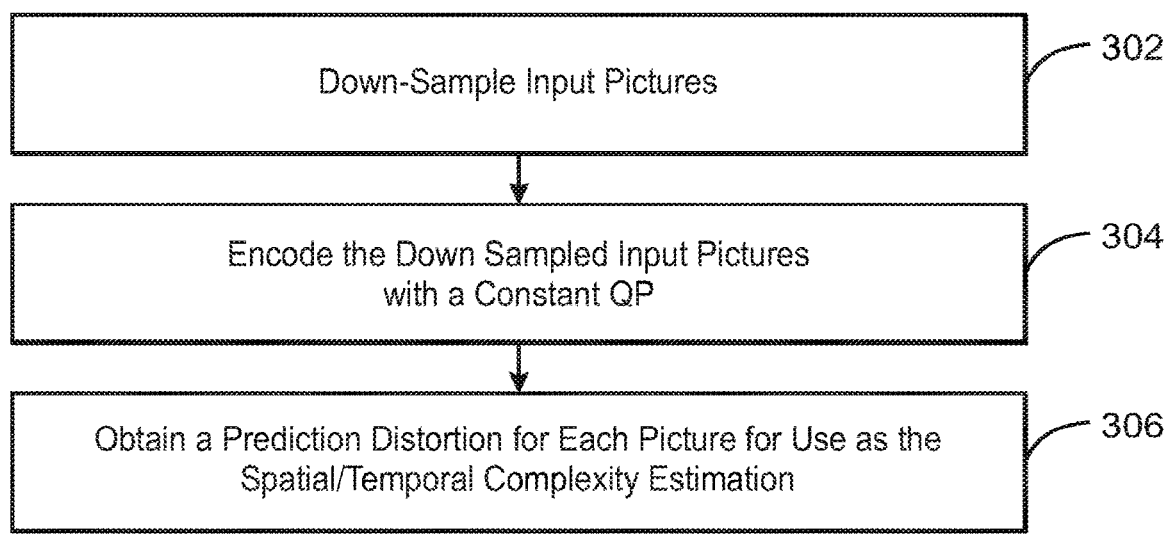
FIG. 3 is a process flow diagram of a method for spatial/temporal complexity analysis of a current frame.

FIG. 3 is a process flow diagram of a method 300 for spatial/temporal complexity analysis of a current frame. The example method 300 can be implemented in the system 100 of FIGS. 1, the computing device 700 of FIG. 7, or the computer readable media 800 of FIG. 8.

The method 300 provides a complexity analysis with simplified encoding prediction process on down-sampled video. At block 302, input pictures are down sampled. At block 304, the down sampled input pictures are encoded with a constant QP. At block 306, a prediction distortion is obtained for each picture for use as the spatial/temporal complexity estimation. The prediction distortion (from the simplified encoding prediction process on down-sampled video) of each picture is used as the picture complexity estimation result. In embodiments, the prediction distortion represents a predicted distortion between an original frame and corresponding reference frame.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
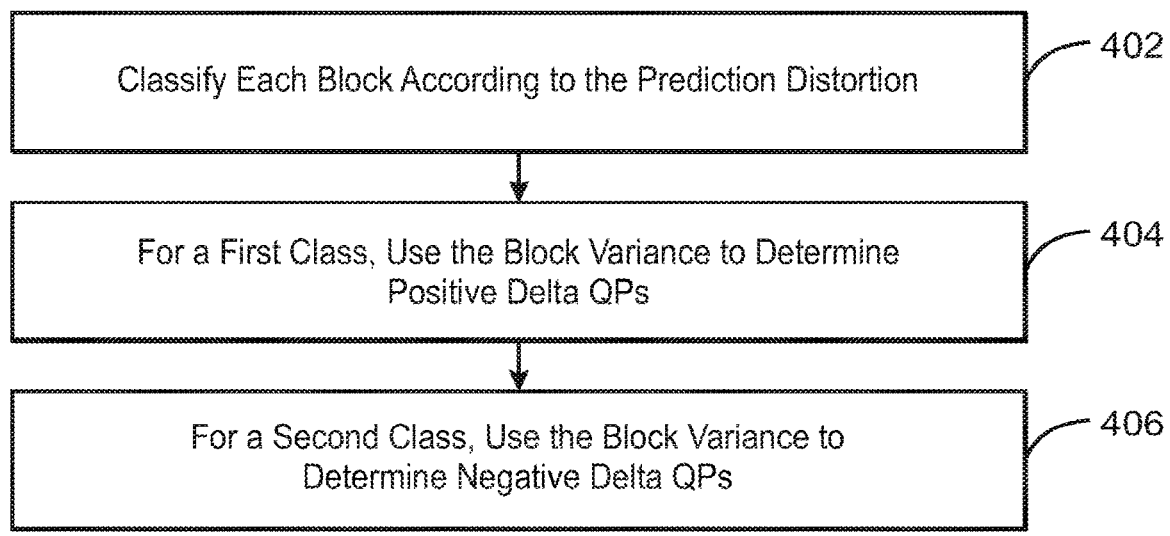
FIG. 4 is a process flow diagram of a method for HVS QP map derivation.

FIG. 4 is a process flow diagram of a method 400 for HVS QP map derivation. The example method 400 can be implemented in the system 100 of FIG. 1, the computing device 700 of FIG. 7, or the computer readable media 800 of FIG. 8.

At block 402, each block is classified according to its prediction distortion. In embodiments, a threshold may be applied to classify each block into two classes. A first class of blocks has a prediction distortion higher than a threshold. In embodiments, the threshold may be determined through empirical investigation. A second class of blocks has a prediction distortion that is less than or equal to the threshold.

At block 404, a block variance is used to determined positive delta QPs for the first class of blocks with a prediction distortion higher than the threshold. The positive delta QP for each block is applied as an increase of the QP on top of picture level QP. At block 406, a block variance is used to determine negative delta QPs for the second class of blocks with a prediction distortion that is less than or equal to the threshold. The negative delta QP for each block is applied as a decrease of the block QP from the picture level QP. The block QPs from the HVS based block adjustment described with respect to FIG. 4 may be further adjusted using a history complexity visual masking adjustment.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
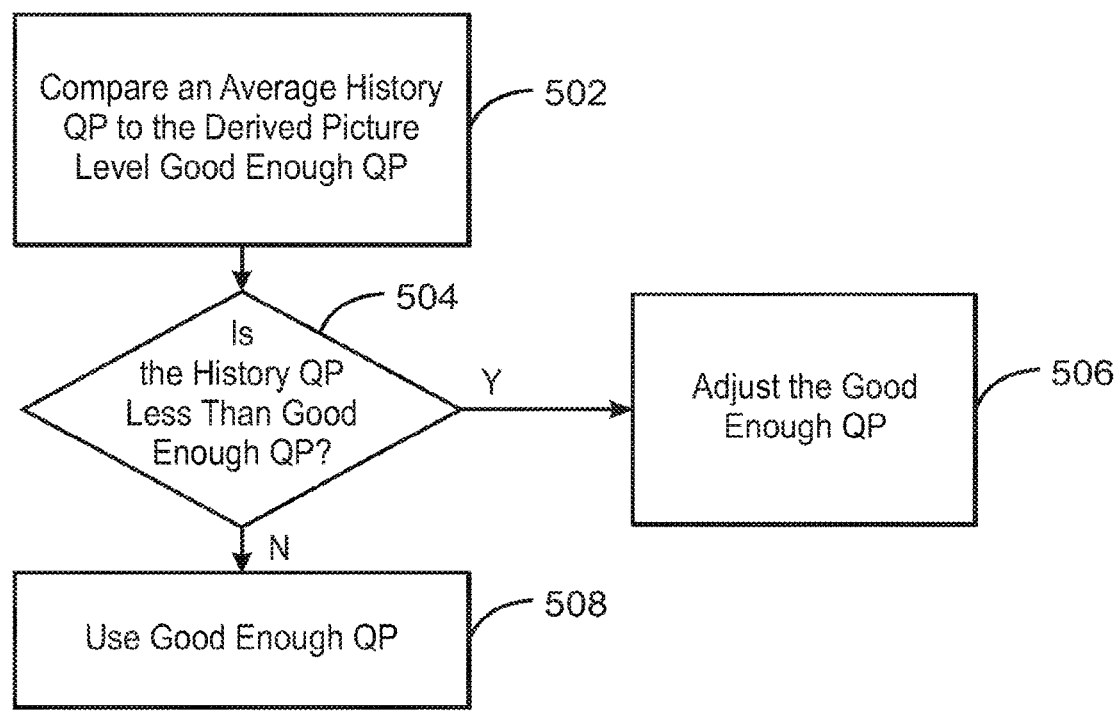
FIG. 5 is a process flow diagram of a method for a history complexity visual masking adjustment.

FIG. 5 is a process flow diagram of a method 500 for a history complexity visual masking adjustment. The example method 500 can be implemented in the system 100 of FIG. 1, the computing device 700 of FIG. 7, or the computer readable media 800 of FIG. 8.

At block 502, an average history QP value is compared to the derived picture level good enough QP value. The derived picture level good enough QP is found, for example, at block 114 of FIG. 1. The average history QP value may be provided as an encoding statistic from previously encoded frames from an encoder 126 of FIG. 1. The average history QP value of the previously encoded pictures may be, for example, the average picture level QP of four closest encoded frames. At block 504, the average history QP value of the previously encoded pictures is compared to the derived picture level good enough QP value. If the average history QP value is less than the derived picture level good enough QP value, process flow continues to block 506. At block 506, the derived picture level good enough QP is adjusted. In particular, if the picture level good enough QP value is larger than the average history QP plus a threshold, the final good enough QP value is set to equal to average history QP value plus the threshold. If the derived picture level good enough QP is less or equal to the average history QP, process flow continues to block 508. At block 508, the picture level good enough QP is used for the HVS QP map. A final QP decision may be made at block 120 (FIG. 1) as described above.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation.

Figure 6:
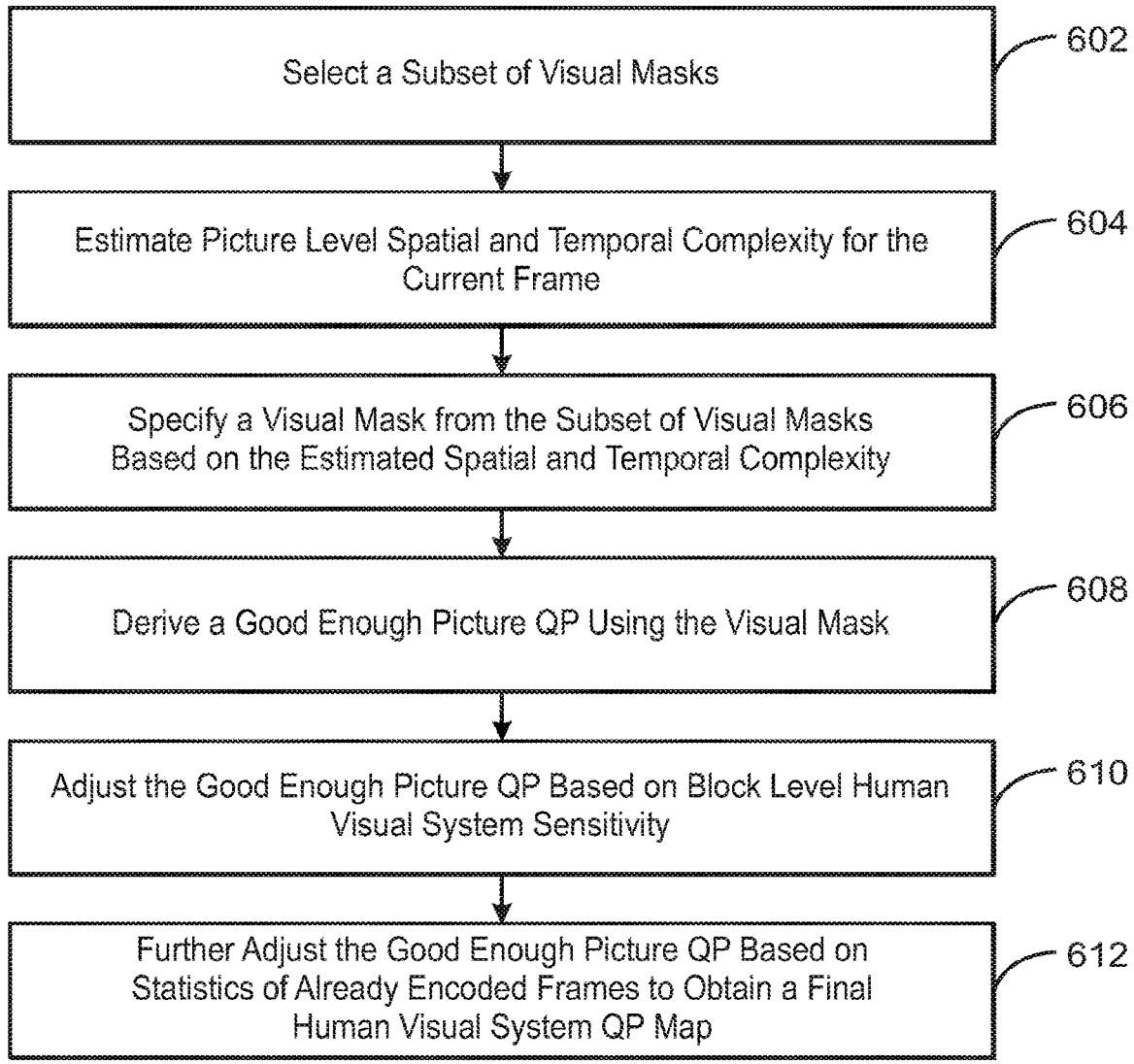
FIG. 6 is a process flow diagram of a method for a human visual system adaptive video coding.

FIG. 6 is a process flow diagram of a method 600 for a for human visual system adaptive video coding. The example method 600 can be implemented in the system 100 of FIG. 1, the computing device 700 of FIG. 7, or the computer readable media 800 of FIG. 8. Further, the example method 600 can be implemented via the methods 200, 300, 400, and 500 of FIGS. 2-5, respectively.

At block 602, a subset of visual masks is selected. At block 604, picture level spatial/temporal complexity is estimated for the current frame. At block 606, a visual mask is specified from the subset of visual masks based on the estimated spatial/temporal complexity of the current frame. At block 608, a picture level good enough QP value is derived using the visual mask. At block 610, the picture level good enough QP value is adjusted based on block level human visual system sensitivity. At block 612, the picture level good enough QP value is further adjusted based on encoding statistics from previously encoded frames to obtain a final human visual system QP map. In embodiments, the block level QP values from the HVS QP map may be compared with an initial QP. The initial QP may be derived using variable bit rate control. After the final QP decision, the current frame can be encoded using the final QP.

This process flow diagram is not intended to indicate that the blocks of the example method 600 are to be executed in any particular order, or that all of the blocks are to be included in every case. Further, any number of additional blocks not shown may be included within the example method 600, depending on the details of the specific implementation.

Figure 7:
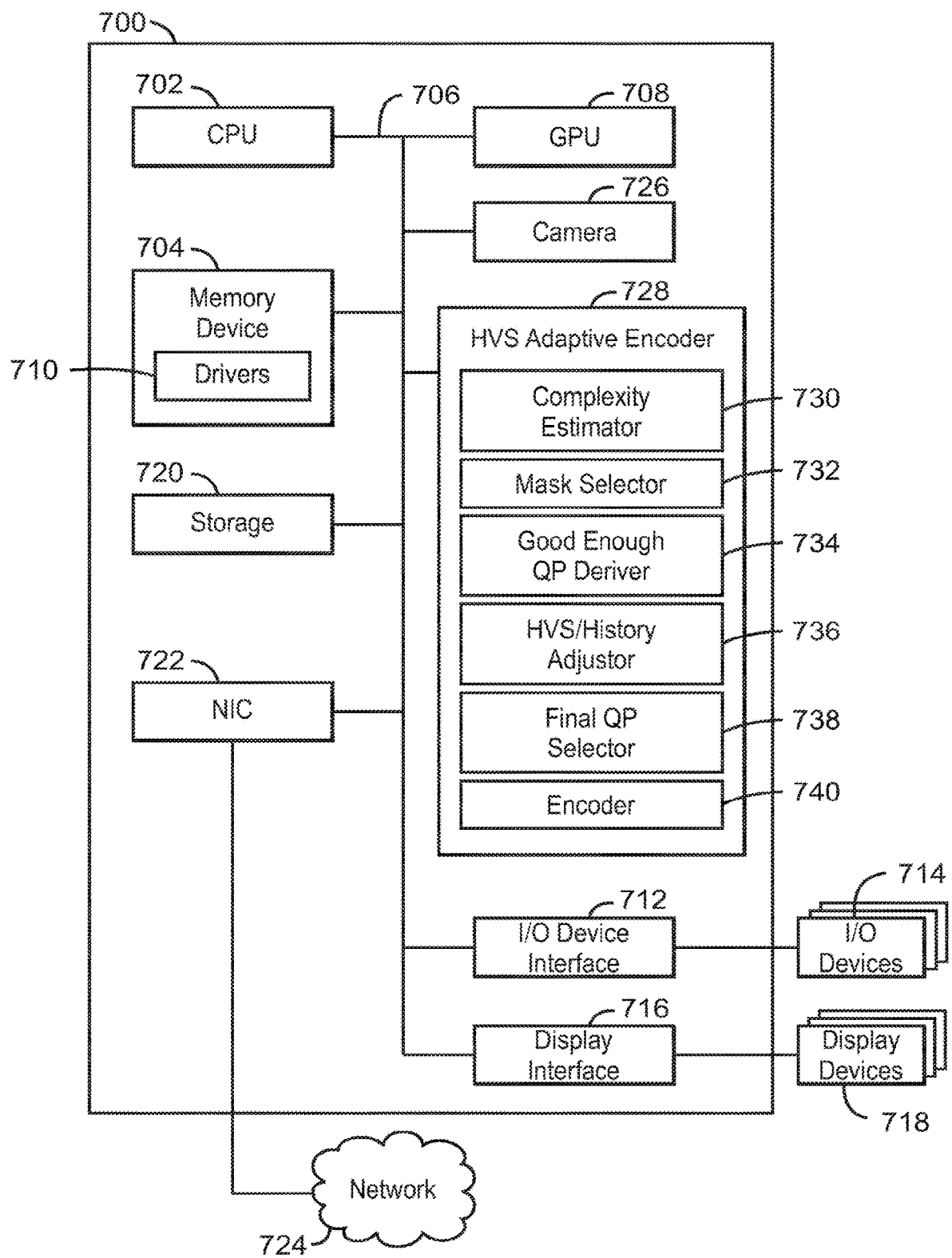
FIG. 7 is a block diagram illustrating an example computing device that can adaptively encode video frames based on the human visual system.

Referring now to FIG. 7, a block diagram is shown illustrating an example computing device that can adaptively encode video frames based on the human visual system. The computing device 700 may be, for example, a laptop computer, desktop computer, tablet computer, mobile device, or wearable device, among others. In some examples, the computing device 700 may be a streaming video capture device, such as a security camera or other camera. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random-access memory (DRAM).

The memory device 704 can include random access memory (RAM), read only memory (ROM), flash memory, or any other suitable memory systems. For example, the memory device 704 may include dynamic random-access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random-access memory (DRAM). The memory device 704 may include device drivers 710 that are configured to execute the instructions for training multiple convolutional neural networks to perform sequence independent processing. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 706 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 700 further includes a camera 726. For example, the camera 726 may include one or more imaging sensors. In some example, the camera 726 may include a processor to generate video frames.

The computing device 700 further includes an HVS adaptive encoder 728. For example, the HVS adaptive encoder 728 can be used to adaptively encode video frames based on detected motion. The HVS adaptive encoder 728 can include a complexity estimator 730, a mask selector 732, a good enough QP deriver 734, an HVS/History adjuster 736, a final QP selector 738, and an encoder 740. In some examples, each of the components 730-740 of the HVS adaptive encoder 728 may be a microcontroller, embedded processor, or software module. The complexity estimator 730 can estimate picture level spatial/temporal complexity for the current frame. The mask selector 732 can specify a visual mask from a subset of visual masks based on the estimated spatial/temporal complexity. The good enough QP deriver 734 can derive a picture level good enough QP using the visual mask. The HVS/History adjuster 736 can adjust the picture level good enough QP based on block level human visual systems sensitivity. The HVS/History adjuster 736 may also adjust the picture level good enough QP based on encoding statistics from previously encoded frames to obtain a final human visual system QP map. A final QP selector 738 may compare the block level QP values from the HVS QP map may be compared with an initial QP to make a final QP decision. The initial QP may be derived using variable bit rate control. An encoder 740 can encode the current frame using final QP.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. The computing device 700 may include any number of additional components not shown in FIG. 7, depending on the details of the specific implementation. Furthermore, any of the functionalities of the complexity estimator 730, the mask selector 732, the good enough QP deriver 734, the HVS/History adjuster 736, the final QP selector 738, and the encoder 740 may be partially, or entirely, implemented in hardware and/or in the processor 702. For example, the functionality may be implemented with an application specific integrated circuit, in logic implemented in the processor 702, or in any other device. In addition, any of the functionalities of the CPU 702 may be partially, or entirely, implemented in hardware and/or in a processor. For example, the functionality of the HVS adaptive encoder 728 may be implemented with an application specific integrated circuit, in logic implemented in a processor, in logic implemented in a specialized graphics processing unit such as the GPU 708, or in any other device.

Figure 8:
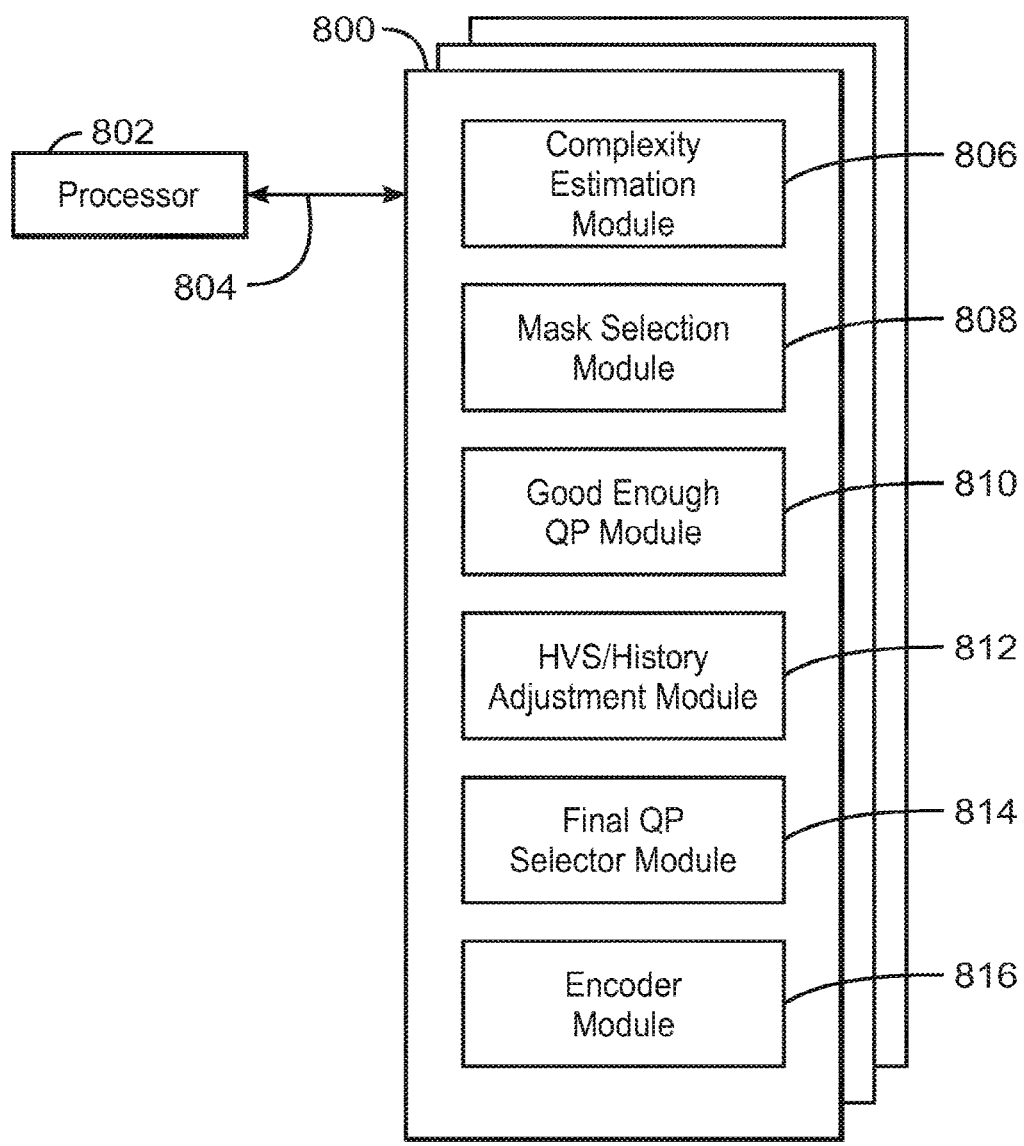
FIG. 8 is a block diagram showing computer readable media that store code for human visual system adaptive encoding.

FIG. 8 is a block diagram showing computer readable media 800 that store code for human visual system adaptive encoding. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a complexity estimator module 806 can estimate picture level spatial/temporal complexity for the current frame. The mask selector module 808 can specify a visual mask from a subset of visual masks based on the estimated spatial/temporal complexity. The good enough QP deriver module 810 can derive a picture level good enough QP using the visual mask. The HVS/History adjuster module 812 can adjust the picture level good enough QP based on block level human visual systems sensitivity. The HVS/History adjuster module 812 may also adjust the picture level good enough QP based on encoding statistics from previously encoded frames to obtain a final human visual system QP map. A final QP selector module 816 may compare the block level QP values from the HVS QP map may be compared with an initial QP to make a final QP decision. The initial QP may be derived using variable bit rate control. An encoder module 818 can encode the current frame using final QP.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

Example 1 is an apparatus for encoding video frames. The apparatus includes a mask selector to select a subset of visual masks according to an actual target compression ratio and group of pictures (GOP) configuration. The apparatus also includes a complexity estimator to estimate a picture level spatial/temporal complexity for a current frame and a GOP adaptive visual mask selector to specify a visual mask from the subset of the visual masks corresponding to the estimated spatial and temporal complexity value. Additionally, the apparatus includes a good enough picture QP deriver to derive a good enough picture QP value using the visual mask and an adjustor to adjust the good enough picture QP value based on block level human visual system sensitivity and statistics of already encoded frames to obtain a final human visual system QP map.

Example 2 includes the apparatus of example 1, including or excluding optional features. In this example, the final human visual system QP map specifies a QP value for each block of the current frame.

Example 3 includes the apparatus of any one of examples 1 to 2, including or excluding optional features. In this example, a final QP value is obtained by comparing an initial QP value to the HVS QP map for each block, and in response to the initial QP value being is less than a corresponding QP value in the HVS QP map, the corresponding QP value in the HVS QP map is selected for a current block and used for the subsequent encoding process.

Example 4 includes the apparatus of any one of examples 1 to 3, including or excluding optional features. In this example, a target rate adaptive visual mask calculation is performed to derive a set of visual masks for the supported target compression ratios of a video coding standard, spatial/temporal complexity, and GOP configuration through offline training.

Example 5 includes the apparatus of any one of examples 1 to 4, including or excluding optional features. In this example, the picture level spatial/temporal complexity is estimated according to a prediction distortion value obtained for each picture.

Example 6 includes the apparatus of any one of examples 1 to 5, including or excluding optional features. In this example, the GOP adaptive mask selector specifies the visual mask using a GOP configuration as the input and specified visual mask as the output.

Example 7 includes the apparatus of any one of examples 1 to 6, including or excluding optional features. In this example, the visual mask is used to derive a two-dimensional good enough QP lookup table with complexity and compressional ratio as inputs for lookup.

Example 8 includes the apparatus of any one of examples 1 to 7, including or excluding optional features. In this example, during encoding process, a QP look up table that corresponds to a current GOP and compression ratio is selected.

Example 9 is a method for encoding video frames. The method includes selecting a subset of visual masks according to an actual target compression ratio and group of pictures (GOP) configuration. The method also includes estimating a picture level spatial/temporal complexity for a current frame and specifying a visual mask from the subset of the visual masks corresponding to the estimated spatial and temporal complexity value. The method includes deriving a good enough picture QP value using the visual mask and adjusting the good enough picture QP value based on block level human visual system sensitivity and statistics of already encoded frames to obtain a final human visual system QP map.

Example 10 includes the method of example 9, including or excluding optional features. In this example, the final human visual system QP map specifies a QP value for each block of the current frame.

Example 11 includes the method of any one of examples 9 to 10, including or excluding optional features. In this example, a final QP value is obtained by comparing an initial QP value to the HVS QP map for each block, and in response to the initial QP value being is less than a corresponding QP value in the HVS QP map, the corresponding QP value in the HVS QP map is selected for a current block and used for the subsequent encoding process.

Example 12 includes the method of any one of examples 9 to 11, including or excluding optional features. In this example, a target rate adaptive visual mask calculation is performed to derive a set of visual masks for the supported target compression ratios of a video coding standard, spatial/temporal complexity, and GOP configuration through offline training.

Example 13 includes the method of any one of examples 9 to 12, including or excluding optional features. In this example, the picture level spatial/temporal complexity is estimated according to a prediction distortion value obtained for each picture.

Example 14 includes the method of any one of examples 9 to 13, including or excluding optional features. In this example, the method includes specifying the visual mask using complexity as the input and group QP as the output.

Example 15 includes the method of any one of examples 9 to 14, including or excluding optional features. In this example, the visual mask is used to derive a two-dimensional good enough QP lookup table with complexity and compressional ratio as the inputs for lookup.

Example 16 includes the method of any one of examples 9 to 15, including or excluding optional features. In this example, during encoding process, a QP look up table that corresponds to a current GOP and compression ratio is selected.

Example 17 is at least one computer readable medium for encoding video frames having instructions stored therein. The computer-readable medium includes instructions that direct the processor to select a subset of visual masks according to an actual target compression ratio and group of pictures (GOP) configuration. The instructions also direct the processor to estimate a picture level spatial/temporal complexity for a current frame and specify a visual mask from the subset of the visual masks corresponding to the estimated spatial and temporal complexity value. Further, the instructions direct the processor to derive a good enough picture QP value using the visual mask and adjust the good enough picture QP value based on block level human visual system sensitivity and statistics of already encoded frames to obtain a final human visual system QP map.

Example 18 includes the computer readable medium of example 17, including or excluding optional features. In this example, the final human visual system QP map specifies a QP value for each block of the current frame.

Example 19 includes the computer readable medium of any one of examples 17 to 18, including or excluding optional features. In this example, a final QP value is obtained by comparing an initial QP value to the HVS QP map for each block, and in response to the initial QP value being is less than a corresponding QP value in the HVS QP map, the corresponding QP value in the HVS QP map is selected for a current block and used for the subsequent encoding process.

Example 20 includes the computer readable medium of any one of examples 17 to 19, including or excluding optional features. In this example, a target rate adaptive visual mask calculation is performed to derive a set of visual masks for the supported target compression ratios of a video coding standard, spatial/temporal complexity, and GOP configuration through offline training.

Example 21 includes the computer readable medium of any one of examples 17 to 20, including or excluding optional features. In this example, the picture level spatial/temporal complexity is estimated according to a prediction distortion value obtained for each picture.

Example 22 includes the computer readable medium of any one of examples 17 to 21, including or excluding optional features. In this example, the computer-readable medium includes specifying the visual mask using complexity as the input and group QP as the output.

Example 23 includes the computer readable medium of any one of examples 17 to 22, including or excluding optional features. In this example, the visual mask is used to derive a two-dimensional good enough QP lookup table with complexity and compressional ratio as the inputs for lookup.

Example 24 includes the computer readable medium of any one of examples 17 to 23, including or excluding optional features. In this example, during encoding process, a QP look up table that corresponds to a current GOP and compression ratio is selected.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus to encode a video sequence, the apparatus comprising:
  memory;
  machine readable instructions; and
  at least one programmable circuit to be programmed by the machine-readable instructions to:
    access the video sequence;
    determine complexities of blocks in the video sequence;
    select quantization parameter values based on (1) the complexities and (2) a look-up table, the look-up table to include stored quantization parameters, the stored quantization parameters associated respectively with corresponding complexity values and a target human visual perception;
    encode blocks of the video sequence using the quantization parameter values; and
    cause transmission of the encoded blocks.

2. The apparatus of claim 1, wherein one or more of the at least one programmable circuit is to select the quantization parameter values based on activity within the blocks.

3. The apparatus of claim 1, including a decoder to decode the blocks.

4. The apparatus of claim 3, wherein the decoder is to assemble the video sequence based on the decoded blocks.

5. The apparatus of claim 1, wherein the quantization parameter values are inversely related to a level of sensitivity of the human visual perception.

6. The apparatus of claim 1, wherein one or more of the at least one programmable circuit is to select the quantization parameter values based on distortion in frames of the video sequence.

7. The apparatus of claim 1, wherein one or more of the at least one programmable circuit is to:
  detect motion in the video sequence; and
  select the quantization parameter values based on the detected motion.

8. At least one memory comprising computer readable instructions that cause at least one computing device to at least:
  determine complexities of blocks in a video sequence;
  select quantization parameter values based on (1) the complexities and (2) a look-up table, the look-up table to include stored quantization parameters, the stored quantization parameters associated respectively with corresponding complexity values and a target human visual perception;
  encode blocks of the video sequence using the quantization parameter values; and
  cause transmission of the encoded blocks.

9. The at least one memory of claim 8, wherein the instructions are to cause one or more of the at least one computing device to select the quantization parameter values based on activity within the blocks.

10. The at least one memory of claim 8, wherein the instructions are to cause one or more of the at least one computing device to decode the blocks.

11. The at least one memory of claim 10, wherein the instructions are to cause one or more of the at least one computing device to assemble the video sequence based on the decoded blocks.

12. The at least one memory of claim 8, wherein the quantization parameter values are inversely related to a level of sensitivity of the human visual perception.

13. The at least one memory of claim 8, wherein the instructions are to cause one or more of the at least one computing device to select the quantization parameter values based on distortion in frames of the video sequence.

14. The memory of claim 8, wherein the instructions are to cause one or more of the at least one computing device to:
  detect motion in the video sequence; and
  select the quantization parameter values based on the detected motion.

15. An encoder comprising:
  input circuitry to access a video sequence;
  at least one logic circuit to:
    determine complexities of blocks in the video sequence;
    select quantization parameter values based on (1) the complexities and (2) a look-up table, the look-up table to include stored quantization parameters, the stored quantization parameters associated respectively with corresponding complexity values and a target human visual perception; and
    encode blocks of the video sequence using the quantization parameter values; and
  output circuitry to output the encoded blocks.

16. The encoder of claim 15, wherein one or more of the at least one logic circuit is to select the quantization parameter values based on activity within the blocks.

17. The encoder of claim 15, wherein the quantization parameter values are inversely related to a level of sensitivity of the human visual perception.

18. The encoder of claim 15, wherein one or more of the at least one logic circuit is to select the quantization parameter values based on distortion in frames of the video sequence.

19. The encoder of claim 15, wherein one or more of the at least one logic circuit is to:
  detect motion in the video sequence; and
  select the quantization parameter values based on the detected motion.

* * * * *